(12) United States Patent
Hoxmeier

(10) Patent No.: US 6,258,891 B1
(45) Date of Patent: Jul. 10, 2001

(54) SOLVENTLESS PROCESS FOR MAKING POLYSILOXANE POLYMERS

(75) Inventor: Ronald James Hoxmeier, Houston, TX (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/442,158

(22) Filed: Nov. 16, 1999

Related U.S. Application Data

(60) Provisional application No. 60/110,795, filed on Dec. 3, 1998.

(51) Int. Cl.[7] .............................. C08G 77/08; C08K 5/01
(52) U.S. Cl. ........................... 524/848; 524/860; 528/14
(58) Field of Search ..................................... 524/848, 860; 528/14

(56) References Cited

U.S. PATENT DOCUMENTS

| | | | |
|---|---|---|---|
| 3,337,497 | * 8/1967 | Bostick | 260/46.5 |
| 3,663,649 | 5/1972 | Wheeler | 260/827 |
| 3,665,052 | 5/1972 | Saam et al. | 260/827 |
| 5,281,666 | 1/1994 | Hoxmeier | 525/105 |
| 5,296,574 | 3/1994 | Hoxmeier | 528/25 |
| 5,618,903 | * 4/1997 | Hoxmeier et al. | 528/14 |
| 5,925,707 | * 7/1999 | Shafer et al. | 524/490 |
| 5,962,074 | * 10/1999 | Wollner | 427/322 |
| 6,020,430 | * 2/2000 | Schwindeman et al. | 525/105 |

* cited by examiner

Primary Examiner—Margaret G. Moore
(74) Attorney, Agent, or Firm—Donald F. Haas

(57) ABSTRACT

This invention is a solventless process for anionically polymerizing polysiloxane polymers. No volatile hydrocarbon solvent is used. A cyclic siloxane monomer and any comonomer are introduced into a molten polymer phase of a low molecular weight polymer that has a melting point within the polymerization temperature range for the cyclic siloxanes and the comonomer, for example, 30 to 80° C. which is the melting point range for polyethylene wax which is preferred. A non-volatile hydrocarbon oil with a melting point in this range may also be used, especially if a final polymer containing oil is desired. The cyclic siloxane monomer is anionically polymerized in the molten polymer phase or the oil at 30 to 150° C. Ethylene and styrene are preferred comonomers. The low molecular polymer or non-volatile oil is not separated from the polysiloxane after termination of the polymerization.

9 Claims, No Drawings

SOLVENTLESS PROCESS FOR MAKING POLYSILOXANE POLYMERS

This application claims the benefit of U.S. Provisional Application No. 60/110,795, filed Dec. 3, 1998, the entire disclosure of which is hereby incorporated by reference.

FIELD OF THE INVENTION

This invention relates to a solventless process for anionically polymerizing polysiloxane polymers. More particularly, this invention relates to an improved process for making polyethylene-polysiloxane or polystyrene-polysiloxane block copolymers.

BACKGROUND OF THE INVENTION

U.S. Pat. No. 5,618,903 describes polyethylene-polysiloxane block copolymers for use in release surface compositions. Such polymers and polysiloxane homopolymers and other copolymers are made by a process which utilizes a volatile hydrocarbon liquid as the solvent for anionic polymerization. This process necessarily requires an expensive solvent removal step and equipment for recycle of the solvent. Thus, it can be seen that it would be advantageous to provide a process to make block copolymers of this type which does not require the use of a volatile hydrocarbon solvent.

SUMMARY OF THE INVENTION

This invention is a solventless process for anionically polymerizing polysiloxane polymers. No volatile hydrocarbon solvent is used. A cyclic siloxane monomer and any comonomer are introduced into a molten polymer phase of a low molecular weight polymer that has a melting point within the polymerization temperature range for the cyclic siloxanes and the comonomer, for example, 30 to 80° C. which is the melting point range for polyethylene wax which is preferred. A non-volatile hydrocarbon oil with a melting point in this range may also be used, especially if a final polymer containing oil is desired. The cyclic siloxane monomer is anionically polymerized in the molten polymer phase or the oil at 30 to 150° C. Ethylene and styrene are preferred comonomers. Neither the low molecular weight polymer nor the non-volatile oil are separated from the polysiloxane after termination of the polymerization.

A preferred embodiment is a process of polymerizing polyethylene-polysiloxane block copolymers which comprises:

(a) introducing ethylene monomer into a molten polyethylene wax having a melting point in the range of 30 to 80° C., (b) anionically polymerizing the ethylene at a temperature of 30 to 80° C. to form a living polyethylene block, (c) introducing a cyclic siloxane monomer into the molten polyethylene wax, (d) anionically polymerizing the siloxane monomer at a temperature of 30 to 150° C. on the living end of the polyethylene block, and (e) terminating the polymerization.

The cyclic siloxane monomer which forms the polymerized polysiloxane block can be a cyclic siloxane monomer of the formula $(R_1R_2SiO)_n$, where n can be 3 to 10, $R_1$ and $R_2$ are alkyl ($C_1$–$C_{20}$), alkenyl ($C_2$–$C_{20}$), hydrogen, benzyl or phenyl (including alkyl substituted aromatics and polycyclics) and $R_1$ and $R_2$ can be the same or different. The cyclic siloxane monomer is preferably hexamethylcyclotrisiloxane.

DETAILED DESCRIPTION OF THE INVENTION

In general, when solution anionic techniques are used, polymers of anionically polymerizable monomers are prepared by contacting the monomer to be polymerized simultaneously or sequentially with an anionic polymerization initiator such as Group IA metals, their alkyls, amides, silanolates, naphthalides, biphenyls and anthracenyl derivatives. It is preferable to use an organo alkali metal (such as sodium or potassium) compound in the molten polymer phase or the non-volatile oil at a temperature within the polymerization range for the cyclic siloxanes and the comonomers, preferably at a temperature within the range from 30° C. to 150° C. Particularly effective anionic polymerization initiators are organo lithium compounds having the general formula:

$$RLi_n$$

wherein R is an aliphatic, cycloaliphatic, aromatic or alkyl-substituted aromatic hydrocarbon radical having from 1 to 20 carbon atoms; and n is an integer of 1–4.

Since these polysiloxane polymers are intended to be used as additives or modifiers, the solventless polymerization medium does not have to be removed. Actually, this solventless process can be carried out in any hydrocarbon polymer system which exists as a melt phase within the 30 to 80° C. temperature range, e.g., low molecular polyethylene wax, which is preferred, low molecular weight polypropylene, polybutylene, polystyrene, polyisobutylene, hydrogenated polybutadiene or polysioprene, etc. Non-volatile processing oils such as SHELLFLEX® oil can also be used as the polymerization medium.

Polysiloxane homopolymers, such as polydimethylsiloxane or polydiphenylsiloxane can be made according to this process. Block copolymers containing polysiloxane blocks and blocks of other anionically polymerizable monomers can also be made this way. Random copolymer blocks can also be included in the block copolymers. Ethylene and styrene are the preferred comonomers.

The preferred polyethylene-polysiloxane block copolymers of this invention and the general method of making them with hydrocabon solvents are fully described in U.S. Pat. No. 5,618,903, which is herein incorporated by reference. The improvement provided by the present invention is the use of a non-volatile oil or a polymer melt phase having a melting point in the polymerization temperature range for the cyclic siloxane and the comonomers; i.e., a low molecular polyethylene wax in the melt phase as the polymerization medium. This lowers the cost of and simplifies the polymerization process in that there is no need for costly hydrocarbon solvent removal and recycle. The preferred polyethylene wax should have a melting point in the range of 30 to 80° C. since this is the lower end of the range at which polymerization of these polymers is generally carried out.

Ethylene may be polymerized as described above with the addition that it is usually best to include a promoter, such as a diamine, to facilitate the reaction. Examples of these amines which include but are not limited to follow: N,N,N',N'-tetramethylmethylenediamine (TMMDA), N,N,N',N'-tetramethylethylenediamine (TMEDA), N,N,N',N'-tetraethylethylenediamine (TEEDA), N,N,N',N'tetramethyl-1,3-propanediamine (TMPDA), N,N,N',N'-tetramethyl-1,4-butane-diamine (TMBDA), dipiperidinomethane (DIPIM), 1,2-dipiperidinoethane (DIPIE), 1,8-bis(dimethylamino)

naph-thalene, N,N,N',N'tetramethyl-o-phenylenediamine (TMOPDA), 1,2-dipyrolidinoethane (DIPIP), 1,3-dipiperidinopropane (DIPIP), 1,2-bis(2.6-dimethyl-piperidino)cyclohexane (BDMPC), sparteine, and the like.

The ethylene polymerization reaction can be carried out at 30° C. to 80° C., preferably 40° C. to 60° C. The ethylene pressure can be from 10 psig to 1000 psig, preferably 100 to 500 psig, The polymerization time can run from 10 minutes to 2 hours, preferably 30 minutes to 1 hour.

When the polymerization of the ethylene is complete, living polyethylene blocks are present in the polymerization polymer melt phase. These are perfectly linear polyethylene-alkyllithiums. These living polyethylenes can then be reacted with cyclic siloxane monomers $(R_1R_2SiO)_n$, where n=3–10, $R_1$, and $R_2$ =alkyl $(C_1-C_{20})$, alkenyl $(C_2-C_{20})$, hydrogen, benzyl or phenyl (including alkyl substituted aromatics and polycyclics) and $R_1$ and $R_2$ can be the same or different. Specific siloxane monomers include $(Me_2SiO)_3$, $(MeHSiO)_3$, $(Me_2SiO)_4$, $(Me_2SiO)_5$, $(MeHSiO)_4$, $(MeHSiO)_5$, $(Ph_2SiO)_3(Ph_2SiO)_4$, $(Ph_2SiO)_5$, $(PhHSiO)_4$, $(PhHSiO)_5$, $(PhHSiO)_3$, $(vinylmethylSiO)_4$, $(vinylmethylSiO)_5$, $(vinylHSiO)_3$, $(vinylHSiO)_4$, $(vinylHSiO)_5$, $(vinylmethylSiO)_3$, $(PhMeSiO)_3$, $(PhMeSiO)_4$, $(PhMeSiO)_5$. Mixtures of monomers can also be used. When a polydimethylsiloxane block initiated with RLi is desired, the monomer is preferably hexamethylcyclo-trisiloxane (D3) or octamethylcyclotetra-siloxane (D4). The preferred polymer block is polydimethylsiloxane because of favorable kinetics with Li initiator. Additional poly-siloxane blocks can be added to the polymer based on the monomers described above.

This polymerization is carried out in the presence of a polar promoter, including, but not limited to, the promoter present during the ethylene polymerization step. Additional promoter can be added. Such promoters include but are not limited to diethers and/or diamines, such as diethylglyme and/or TMEDA, cyclic ethers such as tetrahydrofuran, and any promoter known to be useful in anionic polymerization. Its purpose is to decrease the reaction time of the D3 polymerization. This reaction is carried out at a temperature of from 30° C. to 150° C., preferably 60 to 100° C., the concentration of the cyclic siloxane monomer in the poly-ethylene wax (described herein in terms of hexamethylcyclotrisiloxane) is from 1 to 80 percent by weight, and the amount of promoter used ranges from 100 ppm to 10,000 ppm. The promoter concentration range is important because higher concentrations cause more rapid reaction. The reaction may be carried out at up to 80 wt % polysiloxane polymer in the wax or other polymer melt phase or non-volatile oil, preferably 50 to 75 percent. This is advantageous because higher polymer loading offers economic advantages because less molten polymer or non-volatile oil is necessary.

The living block copolymer can be recovered directly to give PE-PDMS-O-Li which is a living polymer and has not been terminated. One could manufacture and sell the living polymer itself to others that could then react it to form other polymers and/or add other functionalities such as amino, alcohol, carboxylate, and other heteroatom functionalities. Termination of the polymer may be achieved by several conventional means. If desired, the polymer can be capped with $R_3R_4R_5$-SiX, e.g., to give PE-PDMS-Si$R_3R_4R_5$, where the R's can be alkyl, alkenyl $(C_2-C_{20}$, preferably a vinyl group because of its high reactivity), phenyl, benzyl, hydrogen, and the like, and can be the same or different, and X is halogen, preferably chlorine, or alkoxide, preferably $C_1-C_{20}$. It can be protonated with, e.g., acetic acid, to give PE-PDMS-OH. It can also be coupled with, e.g., $SiCl_4$, $Me_2SiCl_2$, $HSi(OMe)_3$ with coupling agent functionalities from 2 to about 12 to give (PE-PDMS), where n=the number of coupling agent functionalities. The coupling or capping reaction can be carried out from 40 to 100° C. for 5 minutes to 1 hour, preferably 70 to 100° C. for about 10 to 15 minutes.

The block copolymers of the present invention have an overall molecular weight of 1000 to 100,000. Preferably, the weight average molecular weight of the block copolymer is from 1500 to 20,000. The polyethylene block of the block copolymer has a weight average molecular weight of 200 to 15,000, preferably 500 to 5000. The polysiloxane block of the block copolymer has a weight average molecular weight of 500 to 100,000, preferably from 1000 to 20,000.

EXAMPLES

Example 1

To a 1 liter autoclave, 200 g of polyethylene (PE) wax was added (MW=500; m.p. 50° C.). The autoclave was heated to 55° C. to give molten PE wax. 100 mmoles of TMEDA (tetramethylethylenediamine) and 80 mmoles of n-BuLi were charged, followed by reaction with ethylene monomer at 50 to 200 psi and 50 to 60° C. for 1 hour (70 g ethylene total). 15 g of $D_3$ (hexamethylcyclotrisoloxane) as a 50 wt % solution in cyclohexane was added and the temperature raised to 90° C. to complete the cross-over reaction. An additional 100 g of $D_3$ monomer was then added along with 20 g of ethyleneglycoldiethylether (as promoter), and the polymerization of the siloxane block was completed. The polymer was capped (terminated) with 80 mmoles of trim-ethylsilylchloride for 30 minutes at 90° C.

The molten block copolymer/homopolyethylene composition was removed from the autoclave and stored at room temperature in the solid phase. The product composition showed a melting point of about 100° C.

Example 2

This experiment was carried out identically to Example 1, but the product was not capped, thus giving a final product composition PE-PDMS-Li in PE. The product melting point was 122° C. Both polymer compositions of this invention performed as well in adhesives release coating applications as conventional solvent polymerized materials.

I claim:

1. A process of polymerizing polysiloxane polymers and block copolymers which comprises:
   (a) introducing at least one cyclic siloxane monomer and, optionally, one or more comonomers into a molten polymer phase having a melting point within the polymerization temperature range of the siloxane monomer and optional comonomers,
   (b) anionically polymerizing the siloxane monomer and optional comonomers at a temperature of 30 to 150° C., and
   (c) terminating the polymerization.

2. The process of claim 1 wherein the molten polymer phase is selected from the group consisting of polyethylene wax, polypropylene, polybutylene, polystyrene, polyisobutylene, hydrogenated polybutadiene, and hydrogenated polyisoprene.

3. The process of claim 1 wherein the comonomer is ethylene or styrene.

4. The process of claim 1 wherein the polymerization temperature is from 60 to 100° C.

5. A process of polymerizing polysiloxane polymers and block copolymers which comprises:
  (a) introducing at least one cyclic siloxane monomer and, optionally, one or more comonomers into a non-volatile oil having a melting point within the polymerization temperature range of the siloxane monomer and optional comonomers,
  (b) anionically polymerizing the siloxane monomer and optional comonomers at a temperature of 30 to 150° C., and
  (c) terminating the polymerization.

6. The process of claim 5 wherein the comonomer is ethylene or styrene.

7. The process of claim 5 wherein the polymerization temperature is from 60 to 100° C.

8. A process of polymerizing polyethylene-polysiloxane block copolymers which comprises:
  (a) introducing ethylene monomer into a molten polyethylene wax having a melting point in the range of 30 to 80° C.,
  (b) anionically polymerizing the ethylene at a temperature of 30 to 80° C. to form a living polyethylene block,
  (c) introducing a cyclic siloxane monomer to the molten polyethylene wax,
  (d) anionically polymerizing the siloxane monomer at a temperature of 30 to 150° C. on the living end of the polyethylene block, and
  (e) terminating the polymerization.

9. The process of claim 8 wherein the polymerization of the ethylene is carried out at 40 to 60° C. and the polymerization of the cyclic siloxane is carried out at 60 to 100° C.

* * * * *